(12) United States Patent
Segawa et al.

(10) Patent No.: US 10,714,142 B2
(45) Date of Patent: Jul. 14, 2020

(54) DISK DEVICE AND MEDIA SCANNING METHOD

(71) Applicant: Kabushiki Kaisha Toshiba, Minato-ku, Tokyo (JP)

(72) Inventors: Makoto Segawa, Kanagawa (JP); Fuyuki Tawada, Kanagawa (JP); Osamu Yoshida, Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/126,422

(22) Filed: Sep. 10, 2018

(65) Prior Publication Data

US 2019/0287567 A1 Sep. 19, 2019

(30) Foreign Application Priority Data

Mar. 19, 2018 (JP) ................. 2018-051530

(51) Int. Cl.
*G11B 7/00* (2006.01)
*G11B 20/18* (2006.01)
*G11B 19/04* (2006.01)
*G11B 5/012* (2006.01)
*G11B 5/49* (2006.01)

(52) U.S. Cl.
CPC .......... *G11B 20/1889* (2013.01); *G11B 5/012* (2013.01); *G11B 5/4969* (2013.01); *G11B 19/045* (2013.01); *G11B 20/1816* (2013.01); *G11B 2020/1896* (2013.01); *G11B 2220/2516* (2013.01)

(58) Field of Classification Search
None
See application file for complete search history.

(56) References Cited

U.S. PATENT DOCUMENTS

| 4,669,004 A | * | 5/1987 | Moon | G11B 5/5965 360/53 |
| 5,805,547 A | * | 9/1998 | Yamamuro | G11B 20/1258 369/47.14 |
| 6,175,549 B1 | * | 1/2001 | Takagi | G11B 20/10 369/53.15 |
| 6,272,085 B1 | * | 8/2001 | Maeda | G11B 20/1883 369/47.14 |
| 6,295,176 B1 | * | 9/2001 | Reddy | G11B 20/1883 360/48 |

(Continued)

FOREIGN PATENT DOCUMENTS

JP 2010-176766 A 8/2010

*Primary Examiner* — Peter Vincent Agustin
(74) *Attorney, Agent, or Firm* — White & Case LLP

(57) ABSTRACT

According to one embodiment, a disk device includes a disk, a head that performs data read/write processing on a recording region of the disk, a controller that performs a media scan processing for detecting the presence or absence of a defect in a sector in the recording region of the disk in track unit. When the controller performs the media scan processing on a first sector and a second sector arranged in the track, and a third sector arranged between the first sector and the second sector, the controller performs skip processing in which the controller scans the first sector and the second sector, and does not scan the third sector.

6 Claims, 6 Drawing Sheets

(56) References Cited

U.S. PATENT DOCUMENTS

| | | | |
|---|---|---|---|
| 6,470,461 B1 * | 10/2002 | Pinvidic | G11B 20/1883 |
| | | | 714/6.13 |
| RE38,706 E * | 2/2005 | Takagi | G11B 7/00 |
| | | | 369/53.15 |
| 7,415,636 B2 | 8/2008 | Takahashi | |
| 7,929,234 B1 * | 4/2011 | Boyle | G11B 20/1879 |
| | | | 360/31 |
| 8,019,936 B1 * | 9/2011 | Hudiono | G06F 3/0611 |
| | | | 360/69 |
| 9,042,045 B1 * | 5/2015 | Dang | G11B 20/1883 |
| | | | 360/31 |
| 2002/0071193 A1 * | 6/2002 | Ogawa | G11B 5/012 |
| | | | 360/31 |
| 2008/0112072 A1 * | 5/2008 | Kasai | G11B 5/024 |
| | | | 360/71 |
| 2008/0125891 A1 * | 5/2008 | Sakakibara | G11B 27/005 |
| | | | 700/94 |
| 2009/0157959 A1 | 6/2009 | Miyazaki | |
| 2010/0149681 A1 * | 6/2010 | Masuyama | G11B 5/012 |
| | | | 360/75 |
| 2012/0162809 A1 | 6/2012 | Iida | |

* cited by examiner

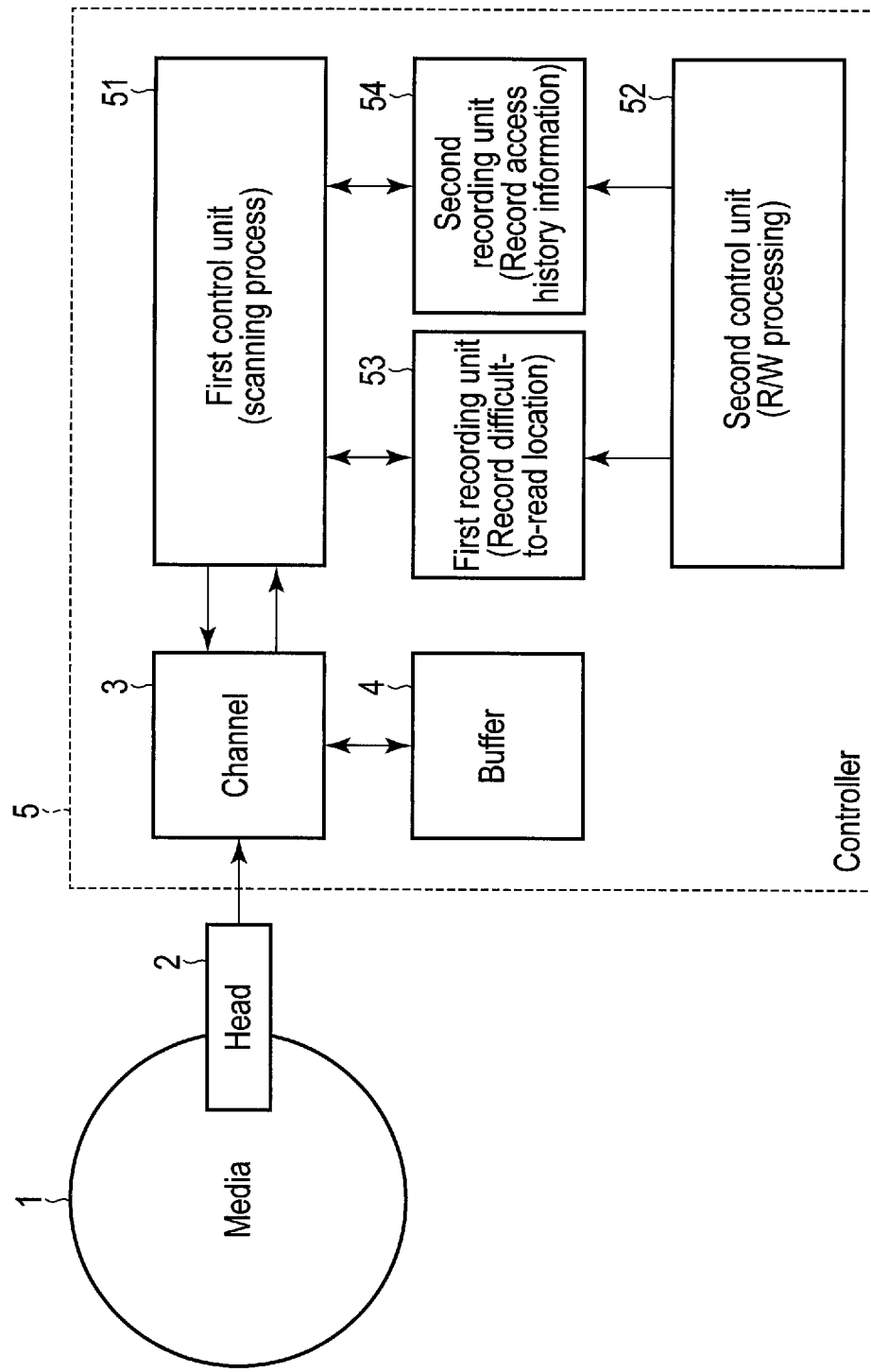
F I G. 1

DISK DEVICE AND MEDIA SCANNING METHOD

CROSS-REFERENCE TO RELATED APPLICATIONS

This application is based upon and claims the benefit of priority from Japanese Patent Application No. 2018-051530, filed Mar. 19, 2018, the entire contents of which are incorporated herein by reference.

FIELD

Embodiments described herein relate generally to a disk device and a media scanning method.

BACKGROUND

In magnetic disk devices, media scanning is usually performed in a user environment. For example, for serial advanced technology attachment hard disk drive (SATA HDD the media scan includes an Auto Offline Scan and a Drive Self Test Extended in which host computer performs a read test to detect the presence or absence of a sector defect in track unit for all of the user area at the idle time when the host computer does not issue any command.

The capacity of the HDD is increasing year by year, and it is thought that it takes several hours to complete the media scan for consumer use, and in the large capacity HDD for Nearline use, it will take dozens of hours in the future.

A channel is one of the parts which consume a lot of power of the HDD. The power consumption of the channel is increased mainly at the time of reading (Read), and the power consumption during the media scan in which reading is performed continuously is also increasing.

For the host computer, in the idle time when performing nothing, the reading processing with large power consumption is performed for all sectors for dozens of hours until the whole scanning is completed, raising the power consumption. When full scan is performed by performing a skip every other track, since the time required for scanning is shortened, the power consumption is lowered. However, there is a problem of missing defects generated in the skipped track.

An object of an embodiment of the present invention is to provide a disk device and a media scanning method capable of reducing power consumption required for media scanning and improving defect detection accuracy.

BRIEF DESCRIPTION OF THE DRAWINGS

FIG. 1 is a block diagram schematically showing a magnetic disk device (HDD) according to an embodiment;

FIGS. 5A to 5H are conceptual diagrams showing a state of concrete skipping in the processing shown in FIG. 2.

DETAILED DESCRIPTION

Figure 2:
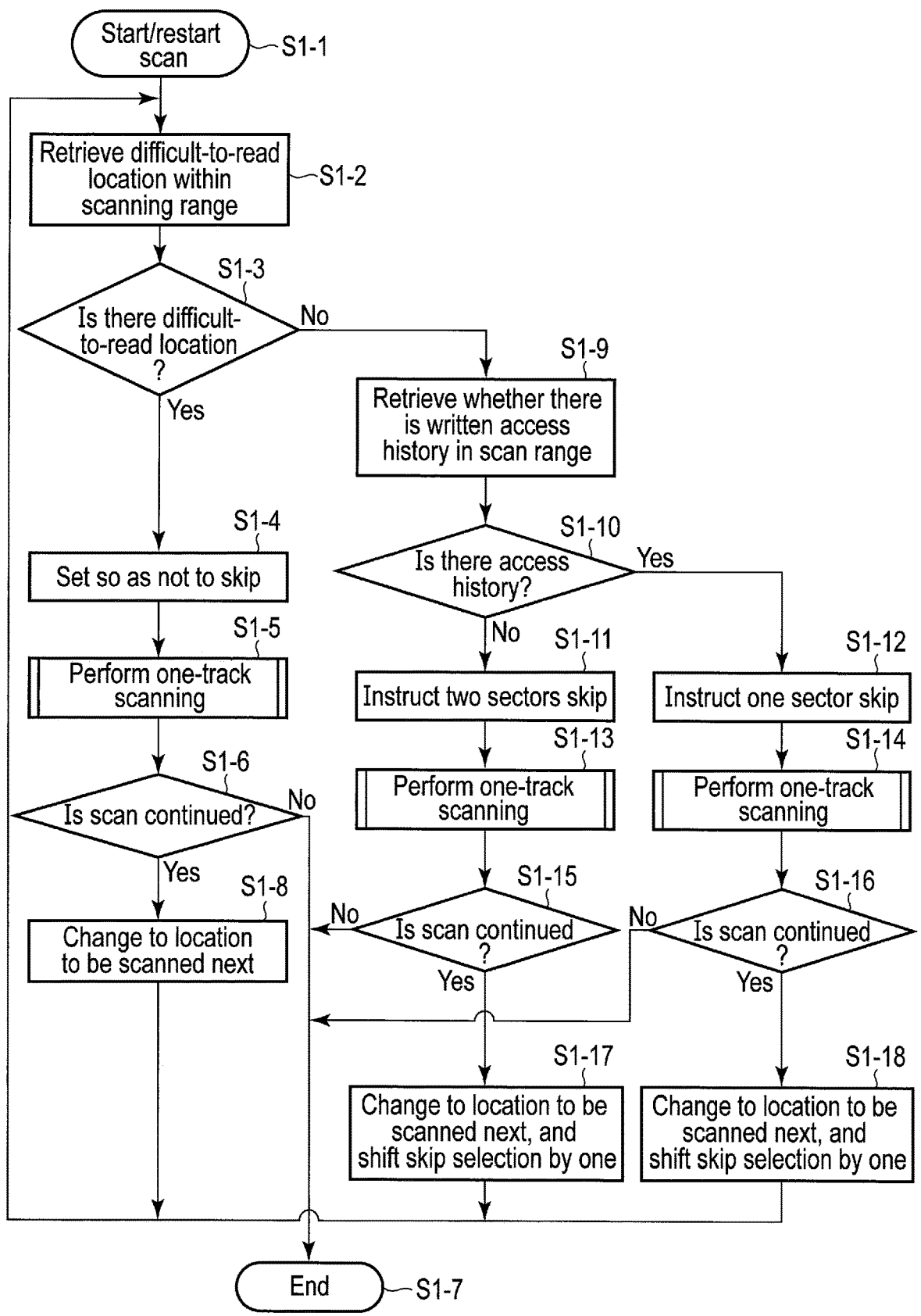
FIG. 2 is a flowchart showing the flow of media scan processing according to the embodiment.

Embodiments will be described hereinafter with reference to the accompanying drawings.

In general, according to one embodiment, a disk device includes a disk, a head that performs data read/write processing on a recording region of the disk, and a controller that controls the media scan processing for detecting a presence or absence of a defect of a sector in track unit on the recording region of the disk. When the controller performs the media scan processing on a first sector and a second sector arranged in the track, and a third sector arranged between the first sector and the second sector, the controller performs skip processing in which the controller scans the first sector and the second sector, and does not scan the third sector.

In the following description, the disclosure is merely an example, and what those skilled in the art may appropriately modify with the gist of the invention and easily come up with naturally falls within the scope of the present invention. Further, in order to make the explanation clearer, the drawings may be schematically represented in terms of the width, thickness, shape, and the like of each part as compared with the actual mode, but it is only an example, and the interpretation of the present invention is not limited. Further, in this specification and each figure, the same reference numerals are given to the same elements as those described above with reference to the preceding figures, and the detailed explanation may be omitted as occasion demands.

With reference to FIGS. 1 to 4 and FIGS. 5A to 5H, a configuration of a magnetic disk device (HDD) according to this embodiment will be described.

FIG. 1 is a block diagram schematically showing a magnetic disk device (HDD) according to an embodiment. The HDD 10 shown in FIG. 1 includes media (magnetic disk) 1 as a recording medium, a head 2 that performs data read/write (read/write, hereinafter referred to as R/W) processing on the medium 1, a channel 3 that decodes the data read by the head 2, performs error correction and the like, and transfers the resulting data to a buffer 4 and temporarily stores it, and a controller 5 that executes media scanning together with R/W control.

A record side of the media 1 is managed by track subdivided in the shape of a concentric circle. Furthermore, the record side is managed with the sector which radially-divided each track equally.

The controller 5 includes a first control unit 51 that performs scan processing during idling and a second control unit 52 that executes normal R/W processing. In both of the first and second control units 51 and 52, when re-tries read during the reproduction operation is performed a predetermined number of times, the address is recorded in a first recording unit 53 as a difficult-to-read location, and access history information indicating past write access destinations is recorded in a second recording unit 54. In the first control unit 51, the skip amount is specified in the channel 3 in the scan processing. When the scanner performs scan processing on a first sector and a second sector arranged in the track, and a third sector arranged between the first sector and the second sector, the scan processing includes a skip processing function in which the scanner scans the first sector and the second sector, and does not scan the third sector.

Both of the first and the second control unit 51 and 52 are capable of updating the control content by firmware (FW).

In the above configuration, with reference to FIGS. 2 to 4 and FIGS. 5A to 5H, the processing content of the present embodiment will be described.

Figure 3:
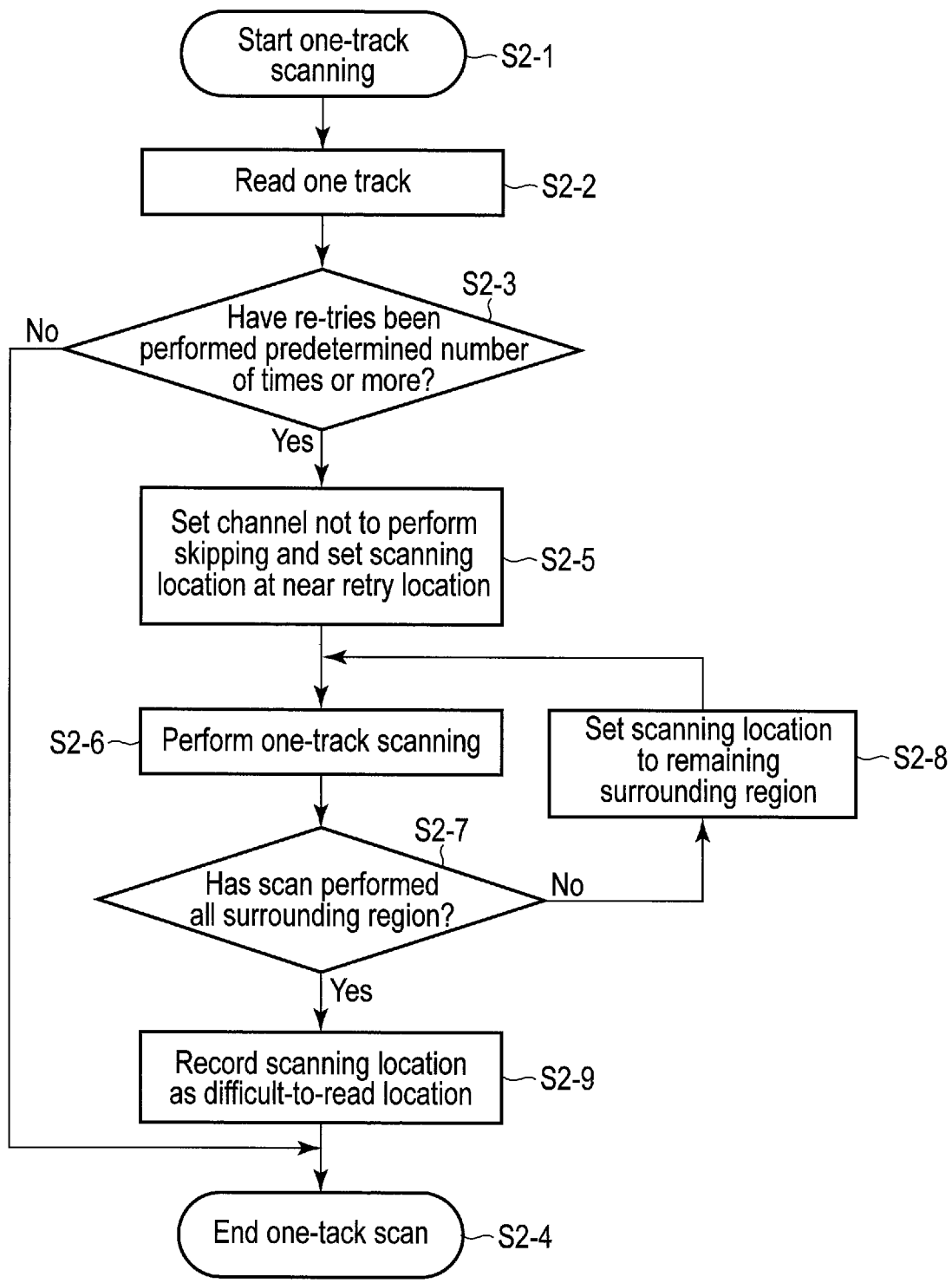
FIG. 3 is a flowchart showing a flow of one-track scan processing in the process shown in FIG. 2.
Figure 4:
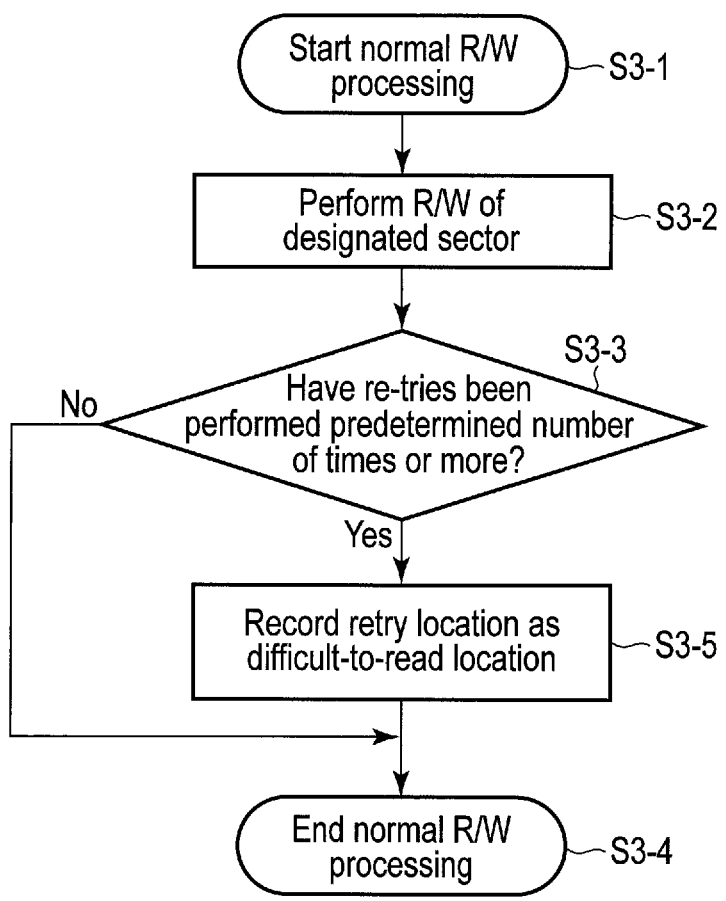
FIG. 4 is a flowchart showing the flow of processing of a normal read/write operation.

FIG. 2 shows the overall flow of the media scan processing by the controller 5 according to the present embodiment, FIG. 3 shows the flow of the one-track scan processing in the process shown in FIG. 2, FIG. 4 shows the flow of processing of a normal read/write (R/W) operation in the process shown in FIG. 2. FIGS. 5A to 5H are conceptual diagrams showing a state of concrete skipping in the process shown in FIG. 2.

In the media scan processing shown in FIG. 2, when scanning the media 1 (regardless of user designation or automatic), the first control unit 51 starts a process in step S1-1. First, in step S1-2, referring to the first recording unit 53 in which a difficult-to-read location is recorded, it is verified in step S1-3 whether there is a difficult-to-read location around the location (range) where scanning which is instructed is performed. When the location is recorded, in order to maximize the ability to detect the defect, in step S1-4, after the channel 3 is set so as not to perform skipping, scanning is performed for one track in step S1-5. The one-track scan processing S1-5 will be described later.

After the completion of the one-track scanning in step S1-5, the first control unit 51 determines in step S1-6 whether to continue the scan processing, and when the process is not continued, ends the process in step S1-7. When it is allowed to continue the process, after a location to be scanned is set to the next location in step S1-8, the process returns to step S1-2. Thereafter, as long as the continuation of the scan processing is instructed, the one-track scan processing is sequentially executed.

When it is determined in step S1-3 that no difficult-to-read location is recorded, referring to the access history information of the second recording unit 54, it is retrieved in step S1-9 whether the location to be scanned is registered. Upon receipt of this retrieval result, it is determined in step S1-10 whether the access history is registered, and in the case where it is determined that the access history is not registered, that is, when it is determined that the writing of the user data has not been registered, it is determined that significance is low and the channel 3 is set to skip two sectors in step S1-11 so as to detect the defect with even lower power. On the other hand, as a result of retrieving the access history information in step S1-9, when it is determined in S1-10 that the writing of the user data is registered, the channel 3 is set to skip one sector in step S1-12 so as to detect the defect with even lower power.

Thereafter, in steps S1-13 and S1-14, scanning of one track is performed as set in the channel 3. After completion of the one-track scanning, the first control unit 51 determines in steps S1-15 and S1-16 whether the scan processing can be further continued, and the process ends in step S1-7 when not continued. When it is allowed to continue the process, the location to be scanned in step S1-17 or S1-18 is set to the next location. At this time, one sector to be skipped is shifted. Thereafter, the process returns to step S1-2 to sequentially execute the scan processing.

The one-track scan processing is performed as shown in FIG. 3. In FIG. 3, the time when one-track scan processing is started in steps S1-5, S1-13, and S1-14, is a time when one-track scanning shown in step S2-1 is started. First, one track is read in step S2-2, and it is verified in step S2-3 whether re-tries have been performed a predetermined number of times or more. This is because as a result of repeating a retry it is determined that re-tries have been performed a predetermined number of times or more even when an error occurs. When it is determined that the number of re-tries is less than a predetermined number of times, one-track scanning ends in step S2-4.

When it is determined in step S2-3 that re-tries have been performed a predetermined number of times or more, it is probable that there is a high possibility that an error occurs around the scanning location. Therefore, in step S2-5, the channel 3 is set so as not to perform skipping, and the scanning location is set around the location where re-tries were performed. In step S2-6, scanning of one track, that is, reading of one track is performed, and step S2-7 (determination as to whether all the surrounding sectors are scanned) and S2-8 (setting the scanning location to the remaining surrounding sectors) are repeated, so that all surrounding sectors of the scanning location are scanned. Thereafter, in step S2-9, the scanning location set around the location where re-tries were performed is recorded in the first recording unit 53 as a difficult-to-read location, and then, the one-track scan processing ends in step S2-4.

In addition, the processing in the normal R/W operation necessary for the present embodiment will be described with reference to FIG. 4.

First, when the normal R/W processing is started in step S3-1, the second control unit 52 performs R/W of the sector designated by the user in step S3-2. At this time, it is determined in step S3-3 whether re-tries have been performed a predetermined number of times or more. When the number of re-tries is less than a predetermined number of times, the normal R/W processing ends in step S3-4. When re-tries have been performed a predetermined number of times or more, the location is recorded in the first recording unit 53 in step S3-5, and the process ends in step S3-4.

According to the above processing, scanning can be performed while reducing the power consumption of the channel 3 since one-track scanning is performed so that the channel 3 is set to skip sectors in steps S1-11 and S1-12.

FIGS. 5A to 5H show specific skip processing examples of the scan processing. In FIGS. 5A to 5H, each cell is set to be one sector, and hatching is applied to the sectors to be scanned. Numbers in the cells indicate a sector number.

Figures 5A, 5B, 5C, 5D:
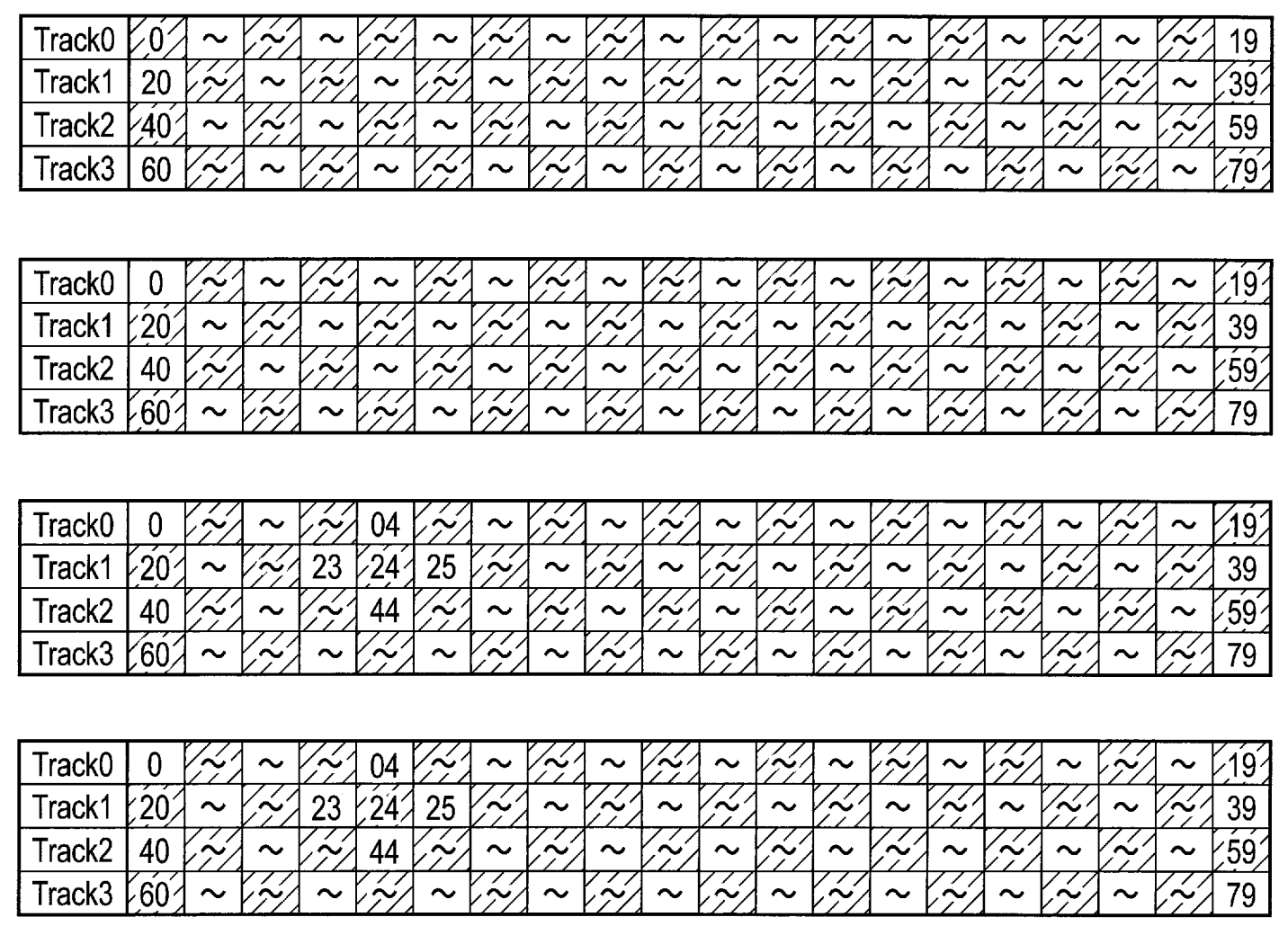

FIG. 5A shows a first entire scanning of the background. In this case, read and scan is performed every other sector using the skip function. It is possible to detect defects caused by scratches in the vertical direction and the horizontal direction.

FIG. 5B shows a second scan of the entire scanning of the background. Here, the location to be skipped is changed to a location which is shifted by one sector from the first scan. As a result, it is possible to reliably detect defects caused by scratches in the vertical direction and the horizontal direction which was overlooked by the first scanning.

FIG. 5C shows a case where an error is detected in the scan processing. That is, when an error is detected in the sector 24 in the figure, scanning (re-reading) is executed without skipping the surrounding sectors 04/23/25/44, and the presence or absence of the next defect is verified.

FIG. 5D shows a case where a retry has occurred during scanning. In this way, the location where the retry has occurred is scanned without skipping from the next time onward. That is, when re-tries have been performed a predetermined number of times or more in the sector 24 in the figure, scanning (re-reading) is executed without skipping the surrounding sectors 04/23/25/44, and the presence or absence of the defect is verified. In addition, the scanning information is recorded in the first recording unit 53 as a difficult-to-read location in the media. In this example, since tracking is managed in track unit, Track 1 is recorded.

Figures 5E, 5F, 5G, 5H:
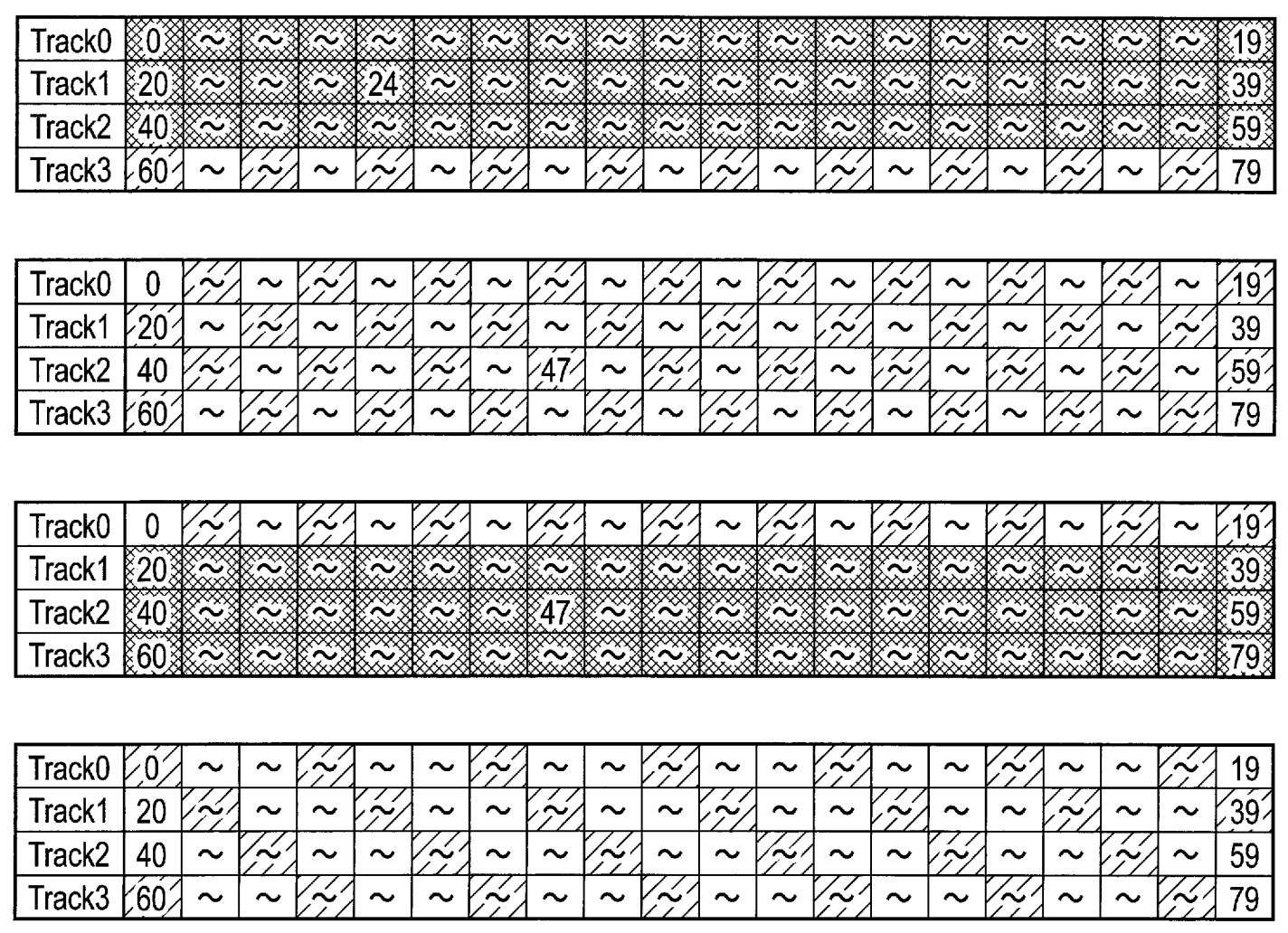

FIG. 5E shows a state in which scanning is performed without skipping in the next and subsequent scan processing around the region recorded as a difficult-to-read location. Here, Track 1 registered in FIG. 5D, and Track 0 and Track 2 around Track 1 are scanned without skipping.

FIG. 5F and FIG. 5G show how to perform scanning without skipping the next time onward when a retry occurs during read/write other than scanning. In other words, as shown in FIG. 5F, when 47 of Track 2 is retried during read/write other than scanning and re-tries are performed a predetermined number of times or more, Track 2 is recorded as a difficult-to-read location in the first recording unit 53. In the next and subsequent scans, as shown in FIG. 5G, Track 1 and Track 3 around the region Track 2 recorded as a difficult-to-read location is scanned without skipping.

FIG. 5H shows an example of scan processing for a region where user data is not written. In this case, in order to reduce power consumption to the utmost, scanning is carried out at intervals of two sectors and by shifting one sector for each track.

As described above, in the HDD according to the present embodiment, the media scan is skipped in sector unit. As a result, the operation rate of the channel 3 is lowered, and the power consumption can be reduced.

In addition, the sectors on which media scan is performed are physically shifted for each track. As a result, media defects extending in any of the circumferential direction and the radial direction can be detected while reducing power consumption.

In addition, in the vicinity of the sector where an error is detected, scanning is performed without skipping. As a result, it is also possible to detect a defective sector and a defect around the defective sector.

In addition, a location that is known to be difficult to read in advance is registered. As a result, it is possible to pinpoint the location where a defect is detected with full effort while reducing power consumption as a whole.

In addition, when performing skipping per sector in media scan, a location to be skipped is changed from a location which was skipped in the previous media scan. As a result, even if there is a defect that falls within the sector skipped in the previous media scan, it can be detected in the next media scan.

Further, since there is no concern as to whether user data is destroyed in a region where user data is not recorded, it is possible to widen the skip width until a level where relatively large defects is detected, and reduce the power consumption.

In the above embodiment, the two-sector skipping is performed in step S1-11 of FIG. 2. However this is not essential and one sector skipping may be performed. In this case, even when a failure cannot be detected by the first media scan, it is possible to reliably test (scan) all the sectors by the second media scan. In addition, the effect of power consumption reduction can be obtained.

Further, in the first embodiment, in the region not registered in the access history information in step S1-10, the scan is performed with two sector skips. However the processes after step S1-11 may not be performed, that is, scan itself may not be performed. In this case, since only the location where the user data exists is selectively tested, it is possible to reduce the time required for the media scan and the electric power required for one performance of the media scan.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device, comprising:
a disk;
a head that performs data read/write processing on a recording region of the disk; and
a controller that controls the media scan processing for detecting a presence or absence of a defect in a sector in the recording region of the disk in track unit,
wherein when the controller performs media scan processing on a first sector and a second sector arranged in the track, and a third sector arranged between the first sector and the second sector, the controller performs skip processing in which the controller scans the first sector and the second sector, and does not scan the third sector, and
the controller optionally changes, for each media scan processing, at least one of the number and a location of the third sector to be skipped in the media skip processing, and performs selection so that physical positions of sectors to be skipped between adjacent tracks do not overlap at the time of the change.

2. The disk device of claim 1, further comprising
a third memory that records an access history indicating a region in which write processing has been performed by the read/write processing; wherein
the controller refers to the third memory at a time of media scan processing, and when a scan range has a region where the write processing has been performed, the controller performs the skip processing for a range where the write processing has been performed.

3. The disk device of claim 2, wherein
the controller refers to the third memory, and
when in a scan range there is no access history in which the write processing has been performed, the controller increases the number of sectors to be subjected to the media skip processing for a range where the write processing is not performed, or suspends the scan processing.

4. The disk device of claim 1, wherein
the skip processing is uniformly performed in accordance with a combination of a predetermined sector which is skipped and a predetermined sector which is not skipped.

5. A disk device, comprising:
a disk;
a head that performs data read/write processing on a recording region of the disk; and
a controller that controls the media scan processing for detecting a presence or absence of a defect in a sector in the recording region of the disk in track unit,
a first memory that records a location of an error sector in which an error was detected when the error sector is detected during the media scan processing by the controller; wherein
the controller refers to the first memory at a time of media scan processing, and when the location of the error sector is included in a scan range, the controller suspends skipping and performs scan processing on each of the error sector on which the skip processing has been performed, sectors arranged before and after the error sector in a first track including the error sector, and a sector which is arranged alongside the error sector in a second track adjacent to the first track.

6. A disk device, comprising:
a disk;
a head that performs data read/write processing on a recording region of the disk; and a controller that controls the media scan processing for detecting a presence or absence of a defect in a sector in the recording region of the disk in track unit, a second memory that records a location of a retry sector where re-tries have been performed a predetermined number of times or more;

wherein the controller refers to the second memory at a time of media scan processing, and when the location of the retry sector is included in a scan range, the controller suspends skipping and performs media scan processing on each of the retry sector on which the skip processing has been performed, sectors arranged before and after the retry sector in a first track including the retry sector, and a sector which is arranged alongside the retry sector in a second track adjacent to the first track.

\* \* \* \* \*